(12) United States Patent
Dominguez et al.

(10) Patent No.: US 9,688,321 B2
(45) Date of Patent: Jun. 27, 2017

(54) DOWNFORCE GENERATION SYSTEM FOR A VEHICLE

(71) Applicants: David Dominguez, Tucson, AZ (US); Jason D. Fahland, Davisburg, MI (US); Joshua R. Auden, Brighton, MI (US)

(72) Inventors: David Dominguez, Tucson, AZ (US); Jason D. Fahland, Davisburg, MI (US); Joshua R. Auden, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/873,600

(22) Filed: Oct. 2, 2015

(65) Prior Publication Data
US 2017/0096180 A1     Apr. 6, 2017

(51) Int. Cl.
*B62D 37/02*     (2006.01)
*B62D 35/02*     (2006.01)
*B60K 13/04*     (2006.01)

(52) U.S. Cl.
CPC .............. *B62D 37/02* (2013.01); *B60K 13/04* (2013.01); *B62D 35/02* (2013.01)

(58) Field of Classification Search
CPC ......... B62D 37/02; B62D 35/02; B60K 13/04
USPC ................. 180/309; 296/180.1, 180.5, 181.5
See application file for complete search history.

(56) References Cited

U.S. PATENT DOCUMENTS

| | | | | |
|---|---|---|---|---|
| 1,923,349 | A * | 8/1933 | Wolverton | A45D 44/12 105/1.2 |
| 2,891,740 | A * | 6/1959 | Campbell | B64C 23/005 244/15 |
| 3,154,267 | A * | 10/1964 | Grant | B64C 23/005 244/15 |
| 3,524,672 | A * | 8/1970 | Rawlings | B62D 37/02 280/762 |
| 3,952,823 | A * | 4/1976 | Hinderks | F01N 13/082 180/164 |
| 4,455,045 | A * | 6/1984 | Wheeler | B62D 35/00 105/1.2 |
| 4,772,060 | A * | 9/1988 | Kretschmer | B62D 35/02 296/180.1 |
| 5,054,844 | A * | 10/1991 | Miwa | B62D 35/005 280/848 |

(Continued)

*Primary Examiner* — J. Allen Shriver, II
*Assistant Examiner* — Brian Cassidy
(74) *Attorney, Agent, or Firm* — Quinn IP Law

(57) ABSTRACT

A vehicle includes an engine generating exhaust gas flow and a vehicle body having a first body end facing oncoming ambient airflow when the vehicle is in motion and an opposite second body end. A vehicle underbody section spans a distance between the first and second body ends. A diffuser disposed at the second body end controls an underbody airflow portion past the second body end. An exhaust duct discharges the exhaust gas via a duct outlet arranged between the underbody section and the diffuser. A first diffuser aperture aligns with the duct outlet for discharging the exhaust gas from the outlet to the ambient. A second diffuser aperture pulls at least a fraction of the underbody airflow over the duct outlet and through the first aperture. The first and second apertures accelerate the pulled underbody airflow to increase a downforce on the vehicle body at the second body end.

20 Claims, 3 Drawing Sheets

(56) References Cited

U.S. PATENT DOCUMENTS

| | | | | |
|---|---|---|---|---|
| 5,322,340 A * | 6/1994 | Sato | ............... | B62D 25/20 180/68.1 |
| 5,813,491 A * | 9/1998 | Sato | ............... | B60K 13/04 180/309 |
| 5,924,763 A * | 7/1999 | Daniels | ............... | B62D 37/02 180/309 |
| 6,575,522 B2 * | 6/2003 | Borghi | ............... | B62D 35/005 296/180.1 |
| 6,637,537 B2 * | 10/2003 | Porter | ............... | F01N 13/08 180/309 |
| 6,685,256 B1 * | 2/2004 | Shermer | ............... | B60J 5/108 296/180.1 |
| 6,742,831 B2 * | 6/2004 | Rees | ............... | B62D 35/007 180/903 |
| 7,717,494 B2 * | 5/2010 | Nagahama | ............... | B62D 37/02 296/180.1 |
| 7,779,961 B2 * | 8/2010 | Matte | ............... | F01N 13/082 181/227 |
| 8,256,826 B2 * | 9/2012 | Fioravanti | ............... | B62D 35/00 296/180.1 |
| 8,366,178 B2 * | 2/2013 | Yamagishi | ............... | B62D 35/02 180/903 |
| 8,731,781 B2 * | 5/2014 | Prentice | ............... | B62D 35/02 296/180.1 |
| 8,882,176 B2 * | 11/2014 | Froling | ............... | B62D 37/02 296/180.1 |
| 9,016,763 B2 * | 4/2015 | Cimatti | ............... | B62D 35/02 180/903 |
| 9,045,176 B1 * | 6/2015 | Henderson, II | ............... | B62D 35/02 |
| 9,333,994 B1 * | 5/2016 | Fahland | ............... | G05D 3/00 |
| 9,381,957 B1 * | 7/2016 | Auden | ............... | B62D 35/007 |
| 2008/0115989 A1 * | 5/2008 | Matte | ............... | F01N 3/021 180/68.1 |
| 2013/0282258 A1 * | 10/2013 | Schoeggl | ............... | B62D 35/02 701/102 |
| 2014/0097638 A1 * | 4/2014 | Froling | ............... | B62D 37/02 296/180.1 |
| 2015/0353149 A1 * | 12/2015 | Wolf | ............... | B62D 35/007 296/180.5 |

* cited by examiner

DOWNFORCE GENERATION SYSTEM FOR A VEHICLE

TECHNICAL FIELD

The disclosure relates to a downforce generating system for a motor vehicle.

BACKGROUND

Downforce is a downwards thrust created by the aerodynamic characteristics of a vehicle. The purpose of downforce is to increase the vertical force on the tires to create more road grip, thus allowing a car to travel faster through a corner. Road-going passenger cars, as well as racecars, can benefit from increased downforce. Downforce on a vehicle body is frequently achieved through use of passive devices, such as diffusers.

Generally, a diffuser is a shaped section of a vehicle underbody that is used to increase effective downforce on the vehicle. A typical diffuser improves the vehicle's aerodynamic properties by enhancing transition between high-velocity airflow underneath the car and the significantly slower free-stream airflow of the ambient atmosphere. As the vehicle moves through the air, the diffuser generally affects pressure under the vehicle body to increase effective downforce thereon.

SUMMARY

A vehicle includes an internal combustion engine generating a flow of exhaust gas as a byproduct of combustion. The vehicle also includes a vehicle body having a first vehicle body end configured to face oncoming ambient airflow when the vehicle is in motion relative to a road surface and a second vehicle body end opposite of the first vehicle body end. The vehicle additionally includes a vehicle underbody section configured to span a distance between the first and second vehicle body ends, and is also configured to define a space between the vehicle body and the road surface. The vehicle also includes a diffuser having a diffuser body disposed at the second vehicle body end and configured to control an underbody portion of the airflow through the space between the vehicle body and the road surface and past the second vehicle body end.

The vehicle additionally includes an exhaust duct extending along the underbody section, having a duct inlet configured to receive the flow of exhaust gas from the engine, and a duct outlet arranged between the vehicle underbody section and the diffuser. The duct outlet is configured to discharge the flow of exhaust gas to the ambient. The diffuser body defines a first aperture configured to align with the duct outlet and facilitate discharge of the flow of exhaust gas from the duct outlet to the ambient at the second vehicle body end. The diffuser body also defines a second aperture configured to pull at least a fraction of the underbody portion of the airflow over the duct outlet and through the first aperture out to the ambient. The diffuser is thereby configured to accelerate the at least a fraction of the underbody portion of the airflow and increase a downforce on the vehicle body at the second body end.

The diffuser may include one or more fins arranged longitudinally relative to the vehicle body and configured to direct the underbody portion of the airflow to the ambient at the second vehicle body end.

The first aperture may be arranged aft of the duct outlet, between the duct outlet and the second vehicle body end.

The second aperture may be arranged between the first aperture and the first vehicle body end.

The diffuser body may cover at least a portion of the exhaust duct outlet.

The diffuser body may be attached to the vehicle body via one or more fasteners.

The first aperture may have an oval or other shape permitting the exhaust gas flow to exit the duct outlet unimpeded to the ambient.

The second aperture may have a rectangular shape that permits sufficient amount of underbody airflow to be pulled into the diffuser and over the duct outlet.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
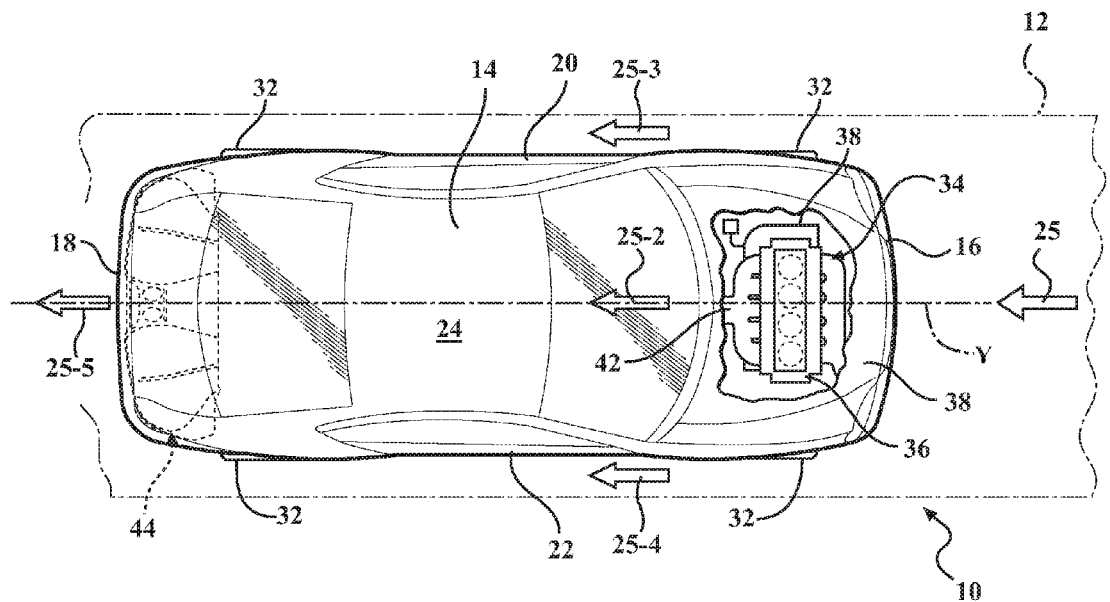
FIG. 1 is a schematic top view of a vehicle according to the disclosure, having a diffuser assembly shown in phantom.

Referring to the drawings, wherein like reference numbers refer to like components, FIG. 1 shows a schematic view of a motor vehicle 10 positioned relative to a road surface 12. The vehicle 10 includes a vehicle body 14 having a longitudinal Y-axis. The vehicle body 14 defines six body sides. The six body sides include a first body end or front end 16, an opposing second body end or rear end 18, a left side 20, and a right side 22, a top body section 24, which frequently includes a vehicle roof, and an underbody section 26 (shown in FIG. 2). As understood by those skilled in the art, the front end 16 is configured to face oncoming ambient airflow 25 when the vehicle is in motion relative to the road surface 12.

Figure 2:
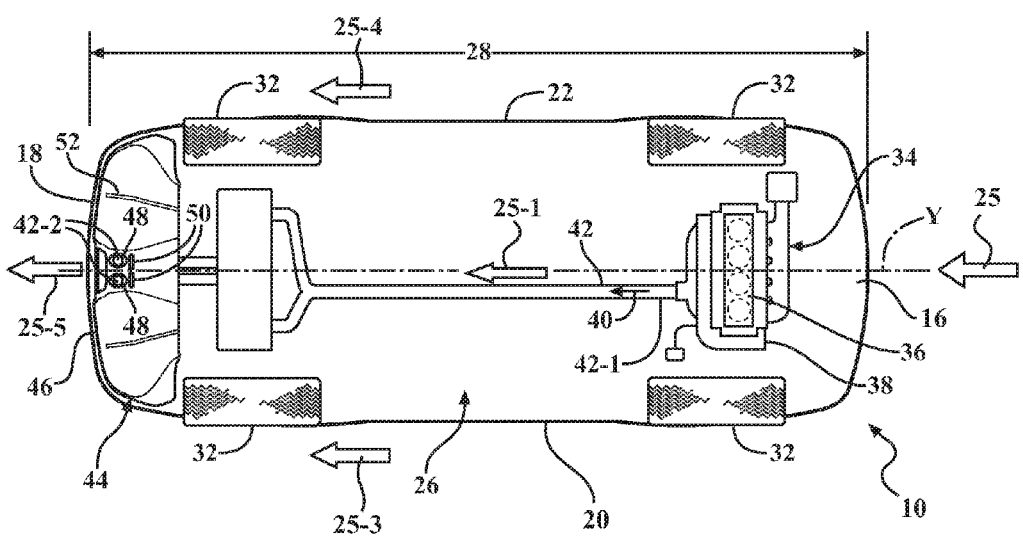
FIG. 2 is a schematic side view of the vehicle depicting the diffuser assembly shown in FIG. 1.
Figure 3:
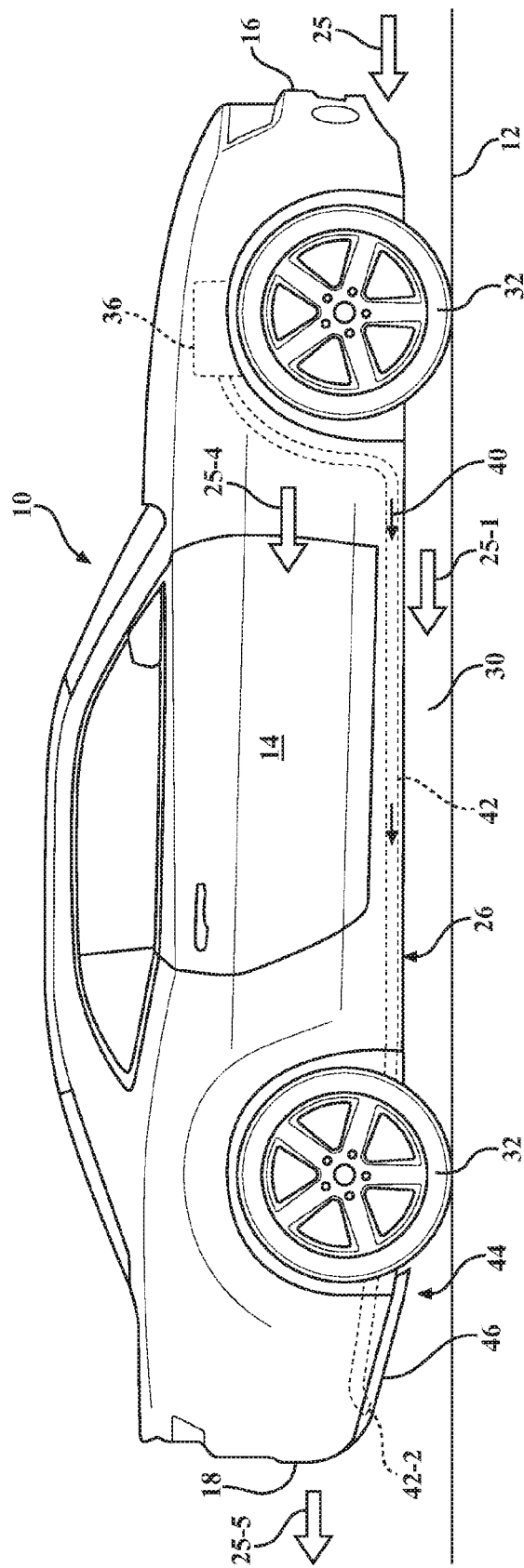
FIG. 3 is a schematic bottom view of the vehicle including a plan view of the diffuser assembly shown in FIGS. 1 and 2 according to the disclosure.

As shown in FIG. 2, the underbody section 26 is configured to span a distance 28 between the front and rear ends 16, 18 of the body 14. The underbody section 26 may have a substantially flat surface and have components of various sub-systems, such as an engine exhaust system and a vehicle suspension (not shown), tucked into specially configured crevices, such that a first airflow portion 25-1 may flow past the vehicle body 14 with limited disturbance. The underbody section 26 also defines a space 30 between the vehicle body 14 and the road surface 12 (as shown in FIG. 3). Accordingly, the space 30 permits the first or underbody airflow portion 25-1 to pass under the vehicle body 14, between the vehicle body 14 and the road surface 12, while a second airflow portion 25-2 passes over the top body section 24. Furthermore, a third airflow portion 25-3 passes around the left and right sides 20, 22. The airflow portions 25-1, 25-2, and 25-3 all rejoin behind the rear end 18 in a wake area or recirculating airflow region 25-5 immediately behind the rear end 18 of the moving vehicle. As understood by those skilled in the art, the recirculating airflow region 25-5 is generally caused at elevated vehicle speeds by the flow of surrounding air around the body sides 18, 20, 22, 24, and 26.

As shown, the vehicle 10 includes a plurality of road wheels 32 and a powertrain 34 having an internal combustion engine 36 for generating engine torque. The powertrain 34 can also include a transmission 38 operatively connecting the engine 36 to at least some of the road wheels 32 for transmitting engine torque thereto. The engine 36 generates a flow of exhaust gas 40 as a byproduct of the combustion and discharges the flow of exhaust gas to the ambient via an exhaust duct 42 extending along the underbody section 26. The exhaust duct 42 includes a duct inlet 42-1 configured to receive the flow of exhaust gas 40 from the engine 36, and a duct outlet 42-2 configured to discharge the flow of exhaust gas to the ambient. The vehicle 10 also includes a diffuser 44 having a diffuser body 46 disposed at the rear end 18 of the vehicle and maybe attached to the vehicle body 14 via fasteners such as screws (shown in FIG. 2), catches, and/or snaps (not shown). The diffuser 44 is configured to control the underbody airflow portion 25-1 through the space between the vehicle body 14 and the road surface 12 and past the rear end 18. As shown, the duct outlet 42-2 is arranged between the vehicle underbody section 26 and the diffuser 44.

Generally, the diffuser 44 works by accelerating the velocity of the underbody airflow portion 25-1 relative to the vehicle body 14. The diffuser 44 works by providing a space for the underbody airflow portion 25-1 to decelerate and expand into an area covered by the vehicle while air density remains constant. Specifically, the diffuser 44 uses Bernoulli's principle, according to which fluid pressure decreases as velocity of the fluid increases. Therefore, the diffuser 44 causes the pressure below the vehicle 10, i.e., in the space 30 between the vehicle body 14 and the road surface 12, to be lower than on the left, right, and top body sections 20, 22, and 24 of the vehicle body 14, thereby generating a measure of downforce FD on the vehicle body at the diffuser 44 location. Generally, because the downforce FD is a function of the flow of air over and under the vehicle 10, i.e., the second airflow portion 25-2 and the underbody airflow portion 25-1, respectively, and because aerodynamic forces increase with the square of velocity, the downforce increases with the square of the vehicle's speed and requires a certain minimum speed in order to produce a significant effect.

With the diffuser 44 installed on the vehicle 10, the air flows into the space 30 from the front end 16, the left side 20, and the right side 22 of the vehicle, following which the air accelerates and reduces pressure under the vehicle body 14. A suction peak is generated at the transition from the underbody section 26 to the diffuser 44. The diffuser 44 then eases the high velocity underbody airflow portion 25-1 back to the velocity of the free-stream airflow portions 25-2 and 25-3 moving past the vehicle body 14 and also helps fill in the recirculating airflow region 25-5, i.e., the wake area immediately behind the vehicle 10. As a result, the diffuser 44 reduces drag and increases the downforce FD on the vehicle body 14 by making the entire underbody section 26 a more efficient downforce-producing device. Additionally, the diffuser 44 imparts upward momentum to the airflow aft of the vehicle 10, which further increases downforce FD on the vehicle.

As shown in FIG. 2, the diffuser body 46 defines a first aperture 48 configured to align with the duct outlet 42-2 and facilitate discharge of the flow of exhaust gas 40 from the duct outlet to the ambient at the rear end 18 of the vehicle body 14. In the exemplary case shown in FIG. 2, the diffuser body 46 defines two first apertures 48 to match the two duct outlets 42-2 used by the specific exhaust duct 42 of the engine 36. The diffuser body 46 also defines a second aperture 50 configured to pull at least a fraction of the underbody airflow portion 25-1 to thereby pass the at least a fraction of the underbody airflow portion over the duct outlet 42-2 and through the first aperture 48 out to the ambient. In order to accomplish the above, the first aperture 48 may be arranged generally aft of the duct outlet 42-2, between the duct outlet and the rear end 18 of the vehicle body 14, while the second aperture 50 may be arranged generally between the first aperture and the front end 16 of the vehicle body. Accordingly, the second aperture 50 is positioned ahead of the first aperture 48, when viewed from the perspective of the oncoming ambient airflow 25. More specifically, the second aperture 50 may be located anywhere from 50 mm to 300 mm from the first aperture 48 along the Y-axis.

The diffuser body 46 may cover at least a portion of the exhaust duct outlet 42-2 in order to pull at least a fraction of the underbody airflow portion 25-1 over the duct outlet via the pressure differential between the exhaust gas 40 and the underbody airflow portion as the exhaust gas exits the diffuser 44 to the ambient. Fundamentally, the above-noted passing of the at least a fraction of the underbody airflow portion 25-1 over the duct outlet 42-2 and through the first aperture 48 accelerates the at least a fraction of the underbody portion of the airflow and increases the downforce FD on the vehicle body 14 at the rear end 18.

Specifically, because even at typical highway speeds of the vehicle 10 the velocity of the exhaust gas exiting the exhaust duct 42 is greater than the velocity of the underbody airflow portion 25-1, the exhaust gas flow exhibits a lower pressure as compared with the pressure of the underbody airflow portion. As a result of such pressure differential, some of the underbody airflow portion 25-1 is pulled into the area between the diffuser 44 and the vehicle body 14 through the second aperture 50. Consequently, the underbody airflow portion 25-1 ahead of the fraction of the underbody airflow portion that was pulled through the second aperture 50 is also sped up. Such increased speed of the entire underbody airflow portion 25-1 reduces the pressure of the underbody airflow portion relative to the pressure of the second airflow portion 25-2 passing over the top body section 24, which, in turn generates increased downforce FD on the vehicle body 14.

Figure 4:
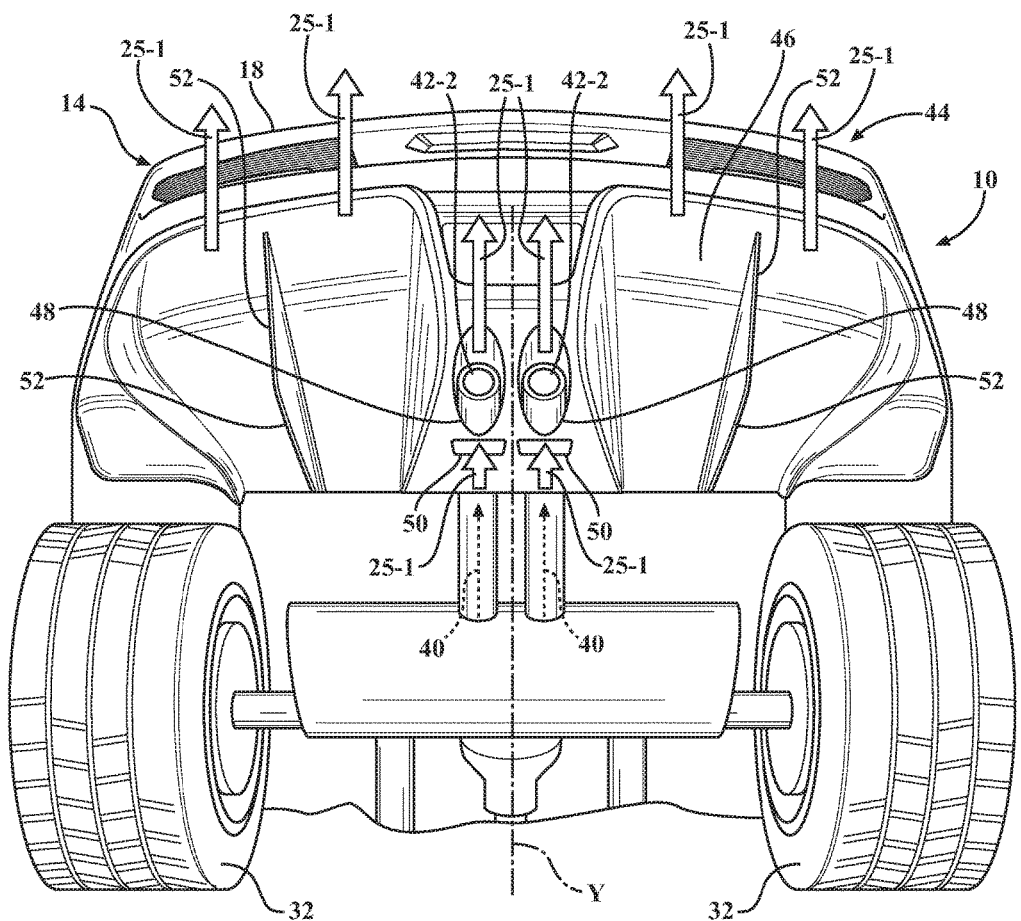
FIG. 4 is a schematic close-up bottom view of the rear end of the vehicle including the plan view of the diffuser assembly shown in FIG. 2.

Although in the above disclosure each of the first and second apertures is described in singular terms, the diffuser body 46 may define a plurality of each of the first and second apertures. Specifically, in FIG. 2 the diffuser 44 is shown as having two second apertures 50 and two first apertures 48 to match the two duct outlets 42-2. In general, to match the number of duct outlets 42-2 employed by the exhaust duct 42 of a particular engine 36, the diffuser body 46 may define as many or as few first and second apertures 48, 50. Additionally, the first aperture 48 may have an oval shape, as shown in FIG. 3, or may have a round or an oblong shape (not shown), while the second aperture 50 may have an oblong shape, such as a shape of a rectangle, as shown in FIG. 3, or, alternatively, a shape of an oval. The diffuser 44 may additionally include one or more fins 52 arranged longitudinally relative to the vehicle body 14, i.e., along the Y-axis (as shown in FIGS. 2 and 4). The fin(s) 52 are configured to streamline and direct the underbody airflow portion 25-1 to the ambient at the rear end 18 of the vehicle body 14.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   an internal combustion engine generating a flow of exhaust gas as a product of combustion;
   a vehicle body arranged along a longitudinal axis and having a first vehicle body end configured to face oncoming ambient airflow, a second vehicle body end opposite of the first vehicle body end, and a vehicle underbody section configured to span a distance between the first and second vehicle body ends;
   a diffuser having a diffuser body disposed at the second vehicle body end and configured to control an underbody portion of the airflow past the second vehicle body end; and
   an exhaust duct extending along the underbody section, having a duct inlet configured to receive the flow of exhaust gas from the engine, and a duct outlet arranged between the vehicle underbody section and the diffuser and configured to discharge the flow of exhaust gas to the ambient;
   wherein the diffuser body defines:
      a first aperture configured to align with the duct outlet and facilitate the discharge of the flow of exhaust gas from the duct outlet to the ambient at the second vehicle body end; and
      a second aperture arranged along the longitudinal axis between the first vehicle body end and the duct outlet and configured to pull at least a fraction of the underbody portion of the airflow over the duct outlet and through the first aperture out to the ambient, to thereby accelerate the at least a fraction of the underbody portion of the airflow and increase a downforce on the vehicle body at the second body end.

2. The vehicle of claim 1, wherein the diffuser includes a fin arranged longitudinally relative to the vehicle body and configured to direct the underbody portion of the airflow to the ambient at the second vehicle body end.

3. The vehicle of claim 1, wherein the first aperture is arranged aft of the duct outlet, between the duct outlet and the second vehicle body end.

4. The vehicle of claim 1, wherein the second aperture is arranged between the first aperture and the first vehicle body end.

5. The vehicle of claim 1, wherein the diffuser body covers at least a portion of the duct outlet.

6. The vehicle of claim 1, wherein the diffuser body is attached to the vehicle body via a fastener.

7. The vehicle of claim 1, wherein the first aperture has an oval shape.

8. The vehicle of claim 1, wherein the second aperture has a rectangular shape.

9. A diffuser for a vehicle having:
   an internal combustion engine generating a flow of exhaust gas as a product of combustion;
   a vehicle body arranged along a longitudinal axis and having a first vehicle body end configured to face oncoming ambient airflow, a second vehicle body end opposite of the first vehicle body end, and a vehicle underbody section configured to span a distance between the first and second vehicle body ends; and
   an exhaust duct extending along the underbody section, having a duct inlet configured to receive the flow of exhaust gas from the engine, and a duct outlet arranged proximate the second vehicle body end and configured to discharge the flow of exhaust gas to the ambient;
   the diffuser comprising a diffuser body disposed at the second vehicle body end and configured to control an underbody portion of the airflow past the second vehicle body end;
   wherein the diffuser body defines:
      a first aperture configured to align with the duct outlet and facilitate the discharge of the flow of exhaust gas from the duct outlet to the ambient at the second vehicle body end; and
      a second aperture arranged along the longitudinal axis between the first vehicle body end and the duct outlet and configured to pull at least a fraction of the underbody portion of the airflow over the duct outlet and through the first aperture out to the ambient, to thereby accelerate the at least a fraction of the underbody portion of the airflow and increase a downforce on the vehicle body at the second body end.

10. The diffuser of claim 9, wherein the diffuser includes a fin arranged longitudinally relative to the vehicle body and configured to direct the underbody portion of the airflow to the ambient at the second vehicle body end.

11. The diffuser of claim 9, wherein the first aperture is arranged aft of the duct outlet, between the duct outlet and the second vehicle body end.

12. The diffuser of claim 9, wherein the second aperture is arranged between the first aperture and the first vehicle body end.

13. The diffuser of claim 9, wherein the diffuser body covers at least a portion of the duct outlet.

14. The diffuser of claim 9, wherein the diffuser body is attached to the vehicle body via a fastener.

15. The diffuser of claim 9, wherein the first aperture has an oval shape.

16. The diffuser of claim 9, wherein the second aperture has a rectangular shape.

17. A vehicle comprising:
   an internal combustion engine generating a flow of exhaust gas as a product of combustion;
   a vehicle body arranged along a longitudinal axis and having a first vehicle body end configured to face oncoming ambient airflow, a second vehicle body end opposite of the first vehicle body end, and a vehicle underbody section configured to span a distance between the first and second vehicle body ends;
   a diffuser having a diffuser body disposed at the second vehicle body end and configured to control an underbody portion of the airflow past the second vehicle body end; and an exhaust duct extending along the underbody section, having a duct inlet configured to receive the flow of exhaust gas from the engine, and a duct outlet arranged between the vehicle underbody section and the diffuser and configured to discharge the flow of exhaust gas to the ambient;

wherein the diffuser body defines:

a first aperture arranged aft of the duct outlet, between the duct outlet and the second body end, and configured to align with the duct outlet and facilitate the discharge of the flow of exhaust gas from the duct outlet to the ambient at the second vehicle body end; and a second aperture arranged along the longitudinal axis between the first vehicle body end and the duct outlet and arranged between the first aperture and the first vehicle body end and configured to pull at least a fraction of the underbody portion of the airflow over the duct outlet and through the first aperture out to the ambient, to thereby accelerate the at least a fraction of the underbody portion of the airflow and increase a downforce on the vehicle body at the second body end.

18. The vehicle of claim 17, wherein the diffuser includes a plurality of fins arranged longitudinally relative to the vehicle body and configured to direct the underbody portion of the airflow to the ambient at the second vehicle body end.

19. The vehicle of claim 17, wherein the diffuser body covers at least a portion of the duct outlet.

20. The vehicle of claim 17, wherein the first aperture has an oval shape and the second aperture has a rectangular shape.

* * * * *